United States Patent
Robustelli et al.

(10) Patent No.: US 12,488,835 B2
(45) Date of Patent: Dec. 2, 2025

(54) WORDLINE BOOST BY CHARGE SHARING IN A MEMORY DEVICE

(71) Applicant: Micron Technology, Inc., Boise, ID (US)

(72) Inventors: Mattia Robustelli, Milan (IT); Innocenzo Tortorelli, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 70 days.

(21) Appl. No.: 17/752,785

(22) Filed: May 24, 2022

(65) Prior Publication Data

US 2023/0386572 A1 Nov. 30, 2023

(51) Int. Cl.
*G11C 13/00* (2006.01)

(52) U.S. Cl.
CPC ...... *G11C 13/0028* (2013.01); *G11C 13/0004* (2013.01); *G11C 13/003* (2013.01); *G11C 13/0038* (2013.01); *G11C 13/0069* (2013.01)

(58) Field of Classification Search
CPC ............ G11C 13/0004; G11C 13/0038; G11C 13/0028; G11C 13/003; G11C 13/0069
See application file for complete search history.

(56) References Cited

U.S. PATENT DOCUMENTS

| | | | | |
|---|---|---|---|---|
| 10,026,478 | B1* | 7/2018 | Choi | G11C 13/0023 |
| 2001/0000309 | A1* | 4/2001 | Ooishi | G11C 11/4074 |
| | | | | 365/230.06 |
| 2008/0007993 | A1* | 1/2008 | Saitoh | G11C 13/0069 |
| | | | | 365/158 |
| 2008/0049487 | A1* | 2/2008 | Yoshimura | G11C 11/22 |
| | | | | 365/189.011 |
| 2009/0213675 | A1* | 8/2009 | Shino | G11C 11/4097 |
| | | | | 365/205 |
| 2012/0075911 | A1* | 3/2012 | Nakura | G11C 13/0007 |
| | | | | 365/148 |
| 2019/0123276 | A1* | 4/2019 | Ratnam | G11C 13/003 |
| 2019/0189203 | A1* | 6/2019 | Redaelli | H10N 70/882 |
| 2022/0406356 | A1* | 12/2022 | Visconti | G11C 11/4085 |

* cited by examiner

*Primary Examiner* — Han Yang
(74) *Attorney, Agent, or Firm* — Greenberg Traurig

(57) ABSTRACT

Systems, methods, and apparatus related to memory devices. In one approach, a memory device includes a memory array. The memory array has first tiles and second tiles. Each of the tiles includes memory cells. Wordlines are configured to select the memory cells in the first and second tiles. A controller programs the selected memory cells by applying a first voltage to a first wordline, and a second voltage to a second wordline. The first and second voltages are applied in a counter-phase manner. The second voltages boosted by charge sharing between the first and second wordlines.

23 Claims, 7 Drawing Sheets

WORDLINE BOOST BY CHARGE SHARING IN A MEMORY DEVICE

FIELD OF THE TECHNOLOGY

At least some embodiments disclosed herein relate to memory systems in general, and more particularly, but not limited to memory devices using charge sharing between access lines (e.g., wordlines) to boost the voltage of one or more access lines when accessing memory cells.

BACKGROUND

Memory devices are widely used to store information in various electronic devices such as computers, wireless communication devices, cameras, digital displays, and the like. Information is stored by programming different states of a memory device. For example, binary devices have two states, often denoted by a logic "1" or a logic "0." In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells may lose their stored state over time unless they are periodically refreshed by an external power source.

A storage device is an example of a memory device. Typical computer storage devices have controllers that receive data access requests from host computers and perform programmed computing tasks to implement the requests in ways that may be specific to the media and structure configured in the storage devices. In one example, a memory controller manages data stored in memory and communicates with a computer device. In some examples, memory controllers are used in solid state drives for use in mobile devices or laptops, or media used in digital cameras.

Firmware can be used to operate a memory controller for a particular storage device. In one example, when a computer system or device reads data from or writes data to a memory device, it communicates with the memory controller.

Memory devices typically store data in memory cells. In some cases, memory cells exhibit non-uniform, variable electrical characteristics that may originate from various factors including statistical process variations, cycling events (e.g., read or write operations on the memory cells), or a drift (e.g., a change in resistance of a chalcogenide alloy), among others.

In one example, reading a set of data (e.g., a codeword, or a page) is carried out by determining a read voltage (e.g., an estimated median of threshold voltages) of memory cells that store the set of data. In some cases, a memory device may include an array of PCM cells arranged in a 3D architecture, such as a cross-point architecture to store the set of data. PCM cells in a cross-point architecture may represent a first logic state (e.g., a logic 1, a SET state) associated with a first set of threshold voltages, or a second logic state (e.g., a logic 0, a RESET state) associated with a second set of threshold voltages. In some cases, data may be stored using encoding (e.g., error correction coding (ECC)) to recover data from errors in the data stored in the memory cells.

For resistance variable memory cells (e.g., PCM cells), one of a number of states (e.g., resistance states) can be set. For example, a single level cell (SLC) may be programmed to one of two states (e.g., logic 1 or 0), which can depend on whether the cell is programmed to a resistance above or below a particular level. As an additional example, various resistance variable memory cells can be programmed to one of multiple different states corresponding to multiple data states, e.g., 10, 01, 00, 11, 111, 101, 100, 1010, 1111, 0101, 0001, etc. Such cells may be referred to as multi state cells, multi-digit cells, and/or multi-level cells (MLCs).

The state of a resistance variable memory cell can be determined (e.g., read) by sensing current through the cell responsive to an applied interrogation voltage. The sensed current, which varies based on the resistance of the cell, can indicate the state of the cell (e.g., the binary data stored by the cell). The resistance of a programmed resistance variable memory cell can drift (e.g., shift) over time. Resistance drift can result in erroneous sensing of a resistance variable memory cell (e.g., a determination that the cell is in a state other than that to which it was programmed, among other issues).

A PCM cell, for example, may be programmed to a reset state (amorphous state) or a set state (crystalline state). A reset pulse (e.g., a pulse used to program a cell to a reset state) can include a relatively high current pulse applied to the cell for a relatively short period of time such that the phase change material of the cell melts and rapidly cools, resulting in a relatively small amount of crystallization. Conversely, a set pulse (e.g., a pulse used to program a cell to a set state) can include a relatively lower current pulse applied to the cell for a relatively longer time interval and with a slower quenching speed, which results in an increased crystallization of the phase change material.

A programming signal can be applied to a selected memory cell to program the cell to a target state. A read signal can be applied to a selected memory cell to read the cell (e.g., to determine the state of the cell). The programming signal and the read signal can be current and/or voltage pulses, for example.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
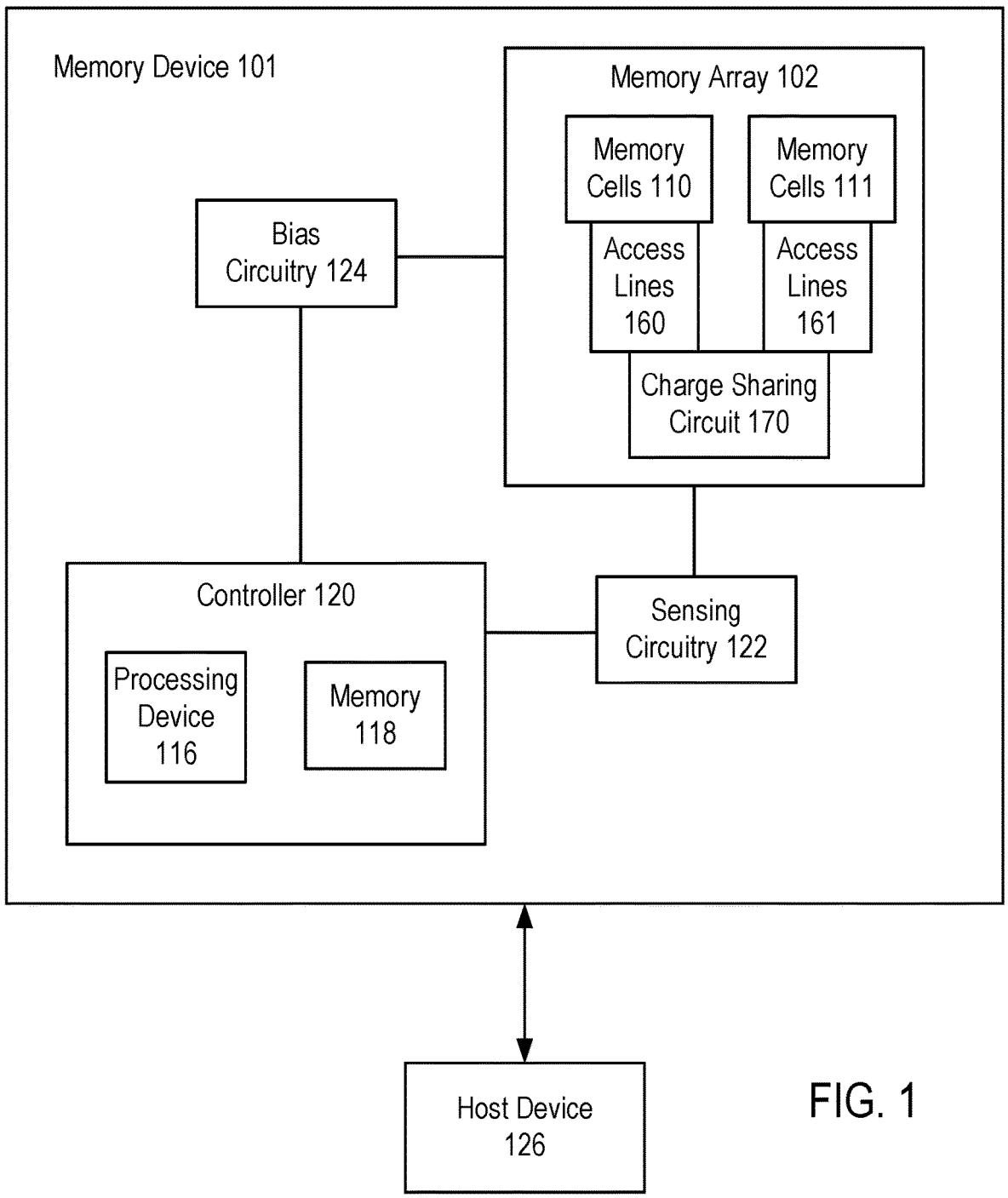
FIG. 1 shows a memory device including a charge sharing circuit to boost the voltage of one or more access lines in a memory array, in accordance with some embodiments.

The following disclosure describes various embodiments for charge sharing between access lines (e.g., wordlines) of a memory device to boost the voltage of one or more access lines when accessing memory cells (e.g., during a write operation). At least some embodiments herein relate to memory devices that use bipolar operations for a memory array. In one example, bipolar select voltages are used to select memory cells of the memory array. In one example, the memory cells are arranged in a cross-point architecture (e.g., two-dimensional or three-dimensional). In one example, each memory cell is formed using a single select device. In one example, the select device includes a chalcogenide material that snaps or thresholds when a sufficient voltage is applied across the memory cell. In other embodiments, other phase change memory cells can be used in which the memory cell thresholds when a sufficient voltage is applied across the cell.

The memory device may, for example, store data used by a host device (e.g., a computing device of an autonomous vehicle, or another computing device that accesses data stored in the memory device). In one example, the memory device is a solid-state drive mounted in an electric vehicle.

In some cases, a memory device may include an array of memory cells arranged in a three-dimensional (3D) architecture, such as a cross-point architecture, to store the set of data. The memory cells in a cross-point architecture may, for example, represent a first logic state (e.g., a logic 1, a SET state) associated with a first set of threshold voltages, or a second logic state (e.g., a logic 0, a RESET state) associated with a second set of threshold voltages.

In other embodiments, the memory cells may be arranged in a three-dimensional (3D) vertical architecture. A 3D vertical architecture may include memory cells located at the crossing between a vertical access line (e.g., a bitline pillar), and each one of a plurality of second access lines (e.g., wordlines), formed in horizontal planes or decks parallel to each other.

More generally, an integrated circuit memory cell, such as a memory cell in a cross-point memory or a 3D vertical array, can be programmed to store data by the way of its state at a voltage applied across the memory cell. For example, if a memory cell is configured or programmed in such a state that allows a substantial current to pass the memory cell at a voltage in a predefined voltage region, the memory cell is considered to have been configured or programmed to store a first bit value (e.g., one or zero); and otherwise, the memory cell is storing a second bit value (e.g., zero or one).

Optionally, a memory cell can be configured or programmed to store more than one bit of data by being configured or programmed, for example, to have a threshold voltage in one of more than two separate voltage regions.

The threshold voltage of a memory cell is such that when the voltage applied across the memory cell is increased to above the threshold voltage, the memory cell changes rapidly or abruptly, snaps (e.g., for a chalcogenide memory cell), or changes (e.g., jumps) from a non-conductive state to a conductive state. The non-conductive state allows a small leak current to go through the memory cell; and in contrast, the conductive state allows more than a threshold amount of current to go through. Thus, a memory device can use a sensor (e.g., sense amplifier) to detect the change, or determine the conductive/non-conductive state of the memory device at one or more applied voltages, to evaluate or classify the level of the threshold voltage of the memory cell and thus its stored data.

The threshold voltage of a memory cell can be configured/programmed to be in different voltage regions used to represent different data values stored in the memory cell. For example, the threshold voltage of the memory cell can be programmed to be in any of four predefined voltage regions; and each of the regions can be used to represent the bit values of a different two-bit data item. Thus, when given a two-bit data item, one of the four voltage regions can be selected based on a mapping between two-bit data items and voltage regions; and the threshold voltage of the memory cell can be adjusted, programmed, or configured to be in the selected voltage region to represent or store the given two-bit data item. To retrieve, determine, or read the data item from the memory cell, one or more read voltages can be applied across the memory cell to determine which of the four voltage regions contain the threshold voltage of the memory cell. The identification of the voltage region that contains the threshold voltage of the memory cell provides the two-bit data item that has been stored, programmed, or written into the memory cell.

For example, a memory cell can be configured or programmed to store a one-bit data item in a Single Level Cell (SLC) mode, or a two-bit data item in a Multi-Level Cell (MLC) mode, or a three-bit data item in a Triple Level Cell (TLC) mode, or a four-bit data item in Quad-Level Cell (QLC) mode.

For some vertical integrated memory devices having a cross-point architecture, flipping or changing of voltage polarity is used to manage the memory cells. In this type of memory device, wordlines are configured as relatively large plates separated by insulating layers (e.g., oxide layers). Each wordline used to select memory cells has a significantly larger capacitance (e.g., parasitic capacitance) (e.g., 5-10 picofarads) than corresponding bitline pillars used to select the same cells. In one example, the wordline capacitance is at least ten times greater than a corresponding pillar capacitance.

This large wordline capacitance causes the technical problem of a wordline requiring significant charge to change its voltage. The charging need exists for doing reads of memory cells, but is particularly acute for programming memory cells. And the need to flip wordline voltage polarities one or more times for a given program operation exacerbates this problem. This large charging requirement dramatically increases the energy consumption of the memory device.

The above vertical integrated memory devices also may use in-tile parallel programming. As a result, wordline and pillar voltage bias must be flipped at least once during a programming operation in which voltage waveforms are applied to the wordline and pillar. The voltage bias must be flipped at least twice if drift cancellation is used. Because the wordline capacitance is very high as described above, pull-up and pull-down of the wordlines consumes a significant part of the total programming energy budget.

In one example, the above parallel programming requires performing some operations in parallel on the same wordline. For example, different pillars on the same wordline are addressed in parallel. Some of the addressed bits will be programmed to zero, and other addressed bits will be programmed to one. Thus, the wordline cannot simply be biased to a single positive or negative voltage to do this programming. Instead, to coordinate all the different programming patterns, the voltage must be flipped at least once.

To address these and other technical problems, a memory device uses charge sharing between access lines of the memory device to boost the voltage of one or more of the access lines when accessing memory cells. For example, the access lines can be wordlines and/or bitlines. In one example, the memory cells are accessed during a write operation.

In one embodiment, a memory device includes multiple tiles, and each tile has memory cells to be programmed at various times (e.g., in response to write commands from a host device). The tiles are divided into two groups (e.g., sometimes arbitrarily indicated herein merely for purpose of illustration as "even" and "odd"). The energy stored in the charged wordlines of one group (e.g., one or more even tiles) is used to partially charge (boost) the wordlines of the other group (e.g., one or more odd tiles), thus recovering part of the energy spent for the program operation. The charging can be done, for example, through a transistor switch. In one example, a switch is used for pairs of tiles (e.g., even and odd tile pairs) and the switch connects the wordlines of each even-odd tile pair.

In one example, in-tile parallel programming is used for each tile, and the tiles are operated in parallel by the controller of the memory device. The number of tiles operated in parallel can vary depending on the implementation.

In order to perform the charge sharing above, the two groups of tiles are operated for at least a portion of the program operation in a counter-phase fashion. In one example, the wordlines for the two groups have an opposite polarity at any given time during the program operation. For example, if the even tile wordline voltage is positive in a phase (e.g., phase number 1), then the corresponding odd tile wordline voltage in the phase of corresponding time is negative. Similarly, for example, if the even tile wordline voltage is negative in a phase (e.g., a subsequent phase number 2), then the corresponding odd tile wordline voltage in the phase of corresponding time is positive, and so on for any subsequent flips in polarity.

In one embodiment, a number of tiles of a memory array are being operated in parallel. The tiles are split in two groups. At any given time during programming, the wordlines for the tiles in a first group are biased counter-phase (e.g., positive vs. negative, negative vs. positive) to the wordlines for the tiles in a second group. This allows the first group of tiles to boost (charge) the wordlines of the second group of tiles, by discharging its wordlines through a dedicated switching circuit (e.g., switch transistor). As a result, part of the energy that has been consumed to charge some wordlines will be re-used to boost the charging of other wordlines, resulting in energy saving.

In one embodiment, the above charge sharing can be used with memory devices using programming algorithms that require one or more polarity flips. The charge sharing can be used for single-level cell memories, or for memories using two or more levels (e.g., MLC, TLC).

In one embodiment, a memory device includes a memory array having at least one first tile and at least one second tile. Each of the first and second tiles includes memory cells. The access lines select at least a portion of the memory cells in the first and second tiles. A controller (e.g., implemented as processing logic, such as one or more processing devices) controls the programming of the selected memory cells.

Memory cells in the first tile are programmed by applying a first voltage to a first access line. Memory cells in the second tile are programmed by applying a second voltage to a second access line. The first and second voltages are applied in a counter-phase manner. The second voltage is boosted by charge sharing between the first and second access lines.

In one embodiment, applying the first and second voltages in a counter-phase manner is accomplished by applying the first and second voltages in parallel using opposite polarities. In another embodiment, applying the first and second voltages in a counter-phase manner is accomplished by applying the first and second voltages using waveforms of the same shape (e.g., identical waveforms for all or at least part of the duration of a program operation, or at least waveforms having the same phase at a given time), and delaying a start of applying the second voltage relative to a start of applying the first voltage.

FIG. 1 shows a memory device 101 including a charge sharing circuit 170 to boost the voltage of one or more access lines 160, 161 in a memory array 102, in accordance with some embodiments. Charge sharing circuit 170 switches charge sharing between access lines 160 and 161. For example, this charge sharing can be done during programming operations. Charge sharing also can be done during read operations.

In one embodiment, memory device 101 applies voltages to memory cells 110, 111 when performing write operations. Memory cells 110 and 111 are located in separate tiles (e.g., even and odd tiles) that are operated in parallel as described herein.

Memory device 101 has a memory controller 120 that controls the applied voltages. Memory controller 120 includes one or more processing devices 116 and memory 118. In one example, memory 118 stores firmware executed by processing device 116 to apply write voltages (e.g., a series of pulses in which polarity is flipped one or more times).

Memory controller 120 can use bias circuitry 124 to generate voltages for applying write and other voltages. For example, bias circuitry 124 generates voltage waveforms for applying write voltages to memory cells 110, 111 as part of programming operations. In some cases, bias circuitry 124 may also be used to generate read voltages for read operations performed on memory array 102 (e.g., in response to a read command from host device 126).

Memory device 101 includes sensing circuitry 122, which is used to sense a state of each memory cell in memory array 102. In one example, sensing circuitry 122 includes sense amplifiers used to detect a current caused by applying various voltages to memory cells in memory array 102. In one example, bias circuitry 124 applies a write voltage to memory cells 110. Sensing circuitry 122 senses a current associated with each of the memory cells 110 caused by applying the write voltage to determine if the cell has snapped.

In one example, if sensing circuitry 122 determines that the current for a memory cell is greater than a fixed threshold (e.g., a predetermined level of current), then memory controller 120 determines that the memory cell has snapped.

In one embodiment, charge sharing circuitry 170 can include sense amplifiers to determine voltages on access lines 160, 161. This determined voltage can be used to trigger the start of charge sharing. In one example, the sense amplifier determines when a wordline voltage transitions from one polarity to another (e.g., reaches or crosses 0 V).

In one embodiment, memory controller 120 receives a write command from a host device 126. The write command is accompanied by data (e.g., user data of a user of host device 126) to be written to memory array 102. In response to receiving the write command, controller 120 initiates a write operation.

In one example, controller 120 uses write voltages (e.g., write pulses) to write a logic state to a memory cells, such as memory cells 110, 111 during a write operation. The write pulses may be applied by providing a first voltage to a bitline and providing a second voltage to a wordline (e.g., access line 160 or 161) to select the memory cells. Circuits coupled to access lines 160, 161 to which memory cells 110, 111 are coupled may be used to provide the write voltages (e.g., access line drivers included in decoder circuits). The circuits may be controlled by internal control signals provided by a control logic (e.g., controller 120). The resulting voltage applied to the memory cells is the difference between the first and second voltages. The write pulses may be the same duration as read pulses in some embodiments. In some embodiments the duration is 10-50 nanoseconds. In some embodiments, the duration is 1-100 nanoseconds. In some embodiments, the duration is 1 nanosecond to 1 microsecond. Writing to the memory cell may take the same time as reading the memory cell in some embodiments.

In one example, the polarity of the read or write pulses may be either a first polarity or a second polarity. For example, a write pulse may apply a voltage to a memory cell in a first polarity (e.g., bitline at +6V and wordline −2.5V).

In one example, after being accessed (e.g., selected), a memory cell may be sensed by a sense component (e.g., sensing circuitry 122) to determine the stored state of the memory cell. For example, a voltage may be applied to the memory cell (using a wordline and bitline) and the presence of a resulting current may depend on the applied voltage and the threshold voltage of the memory cell. In some cases, more than one voltage may be applied. Additionally, if an applied voltage does not result in current flow, other voltages may be applied until a current is detected by the sense component.

By assessing the voltage that resulted in current flow, the stored logic state of the memory cell may be determined. In some cases, the voltage may be ramped up in magnitude until a current flow is detected (e.g., a memory cell turns on, switches on, conducts current, or becomes activated). In other cases, predetermined voltages may be applied sequentially until a current is detected. Likewise, a current may be applied to a memory cell, and the magnitude of the voltage to create the current may depend on the electrical resistance or the threshold voltage of the memory cell.

In some cases, the memory cell (e.g., a PCM cell) includes a material that changes its crystallographic configuration (e.g., between a crystalline phase and an amorphous phase), which in turn, determines a threshold voltage of the memory cell to store information. In other cases, the memory cell includes a material that remains in a crystallographic configuration (e.g., an amorphous phase) that may exhibit variable threshold voltages to store information.

The sense component may include various transistors or amplifiers in order to detect and amplify a difference in the signals (e.g., sense amplifiers). The detected logic state of the memory cell may then be output through a column decoder as output. In some cases, the sense component may be part of a column decoder or a row decoder.

In one example, each of memory cells 110, 111 includes a select device. In one example, the select device includes a chalcogenide. A top electrode conductively connects the select device to a bitline, and a bottom electrode conductively connects the select device to a wordline. In one example, the electrodes are formed of a carbon material.

In one example, the select device includes a chalcogenide (e.g., chalcogenide material and/or chalcogenide alloy). Threshold voltage properties of the select device may be based on the voltage polarities applied to the memory cell.

In one example, a logic state may be written to the memory cell, which may correspond to one or more bits of data. A logic state may be read from or written to the memory cell by applying voltages of different polarities at different voltage and/or current magnitudes. The reading and writing protocols may take advantage of different threshold voltages of the select device that result from the different polarities.

Figure 2:
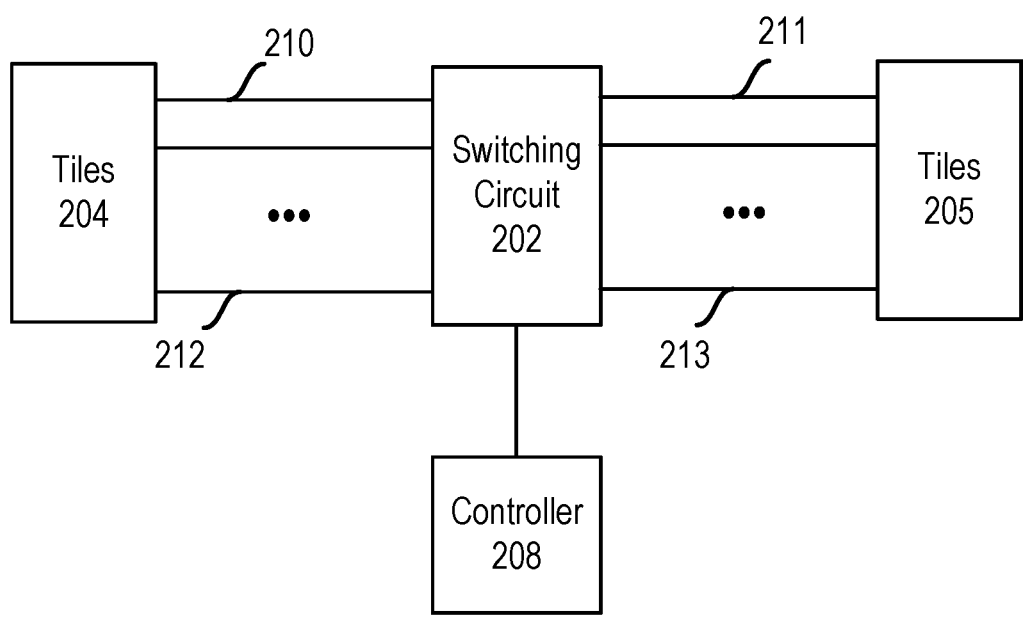
FIG. 2 shows a switching circuit that controls charge sharing between wordlines in a memory array, in accordance with some embodiments.

FIG. 2 shows a switching circuit 202 that controls charge sharing between wordlines in a memory array, in accordance with some embodiments. In one example, the memory array is memory array 102. Memory array 102 includes tiles 204 and 205, which each have memory cells. In one example, tile 204 includes memory cells 110, and tile 205 includes memory cells 111. In one example, switching circuit 202 is part of charge sharing circuit 170. Switching circuit includes, for example, one or more transistors (e.g., CMOS devices).

Memory cells of tiles 204 are selected using wordlines 210, 212. Memory cells of tiles 205 are selected using wordlines 211, 213. Tiles 204 and 205 are programmed in parallel. A voltage is applied to wordlines 210, 212 as part of applying various pulse sequences of positive and negative polarity to the memory cells. A voltage is also applied to wordlines 211, 213 as part of applying various pulse sequences of positive and negative polarity to the memory cells, but is done so in a counter-phase manner such that the polarity of the voltage applied to wordlines 210, 212 is inverse or opposite to the polarity of the voltage applied to wordlines 211, 213.

Switching circuit 202 couples wordlines 210, 212 to wordlines 211, 213 for charge sharing as controlled by controller 208. Controller 208 is an example of controller 120.

During programming, controller 208 initiates charge sharing to selectively boost a wordline(s) voltage. A discharging wordline(s) can be coupled to a charging wordline(s), for example, using multiplexer(s) controlled by controller 208.

Figure 3:
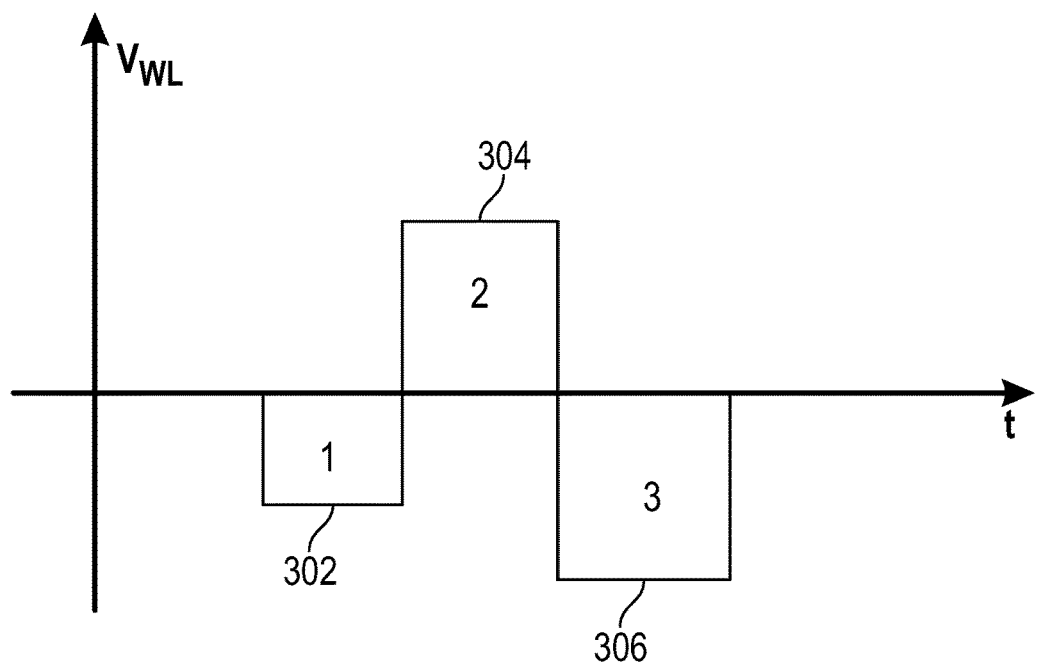
FIG. 3 shows an exemplary voltage waveform applied to a wordline, in accordance with some embodiments.

FIG. 3 shows an exemplary voltage waveform (vertical axis) applied to a wordline as a function of time (horizontal axis), in accordance with some embodiments. In one example, the waveform is a voltage ($V_{WL}$) applied to access line 160, 161 or wordlines 210, 212, 211, 213.

The waveform is applied in three phases indicated as 1, 2, 3. The polarity is flipped going from phase 1 to 2, and flipped going from phase 2 to 3. Wordline voltage 302 is negative, wordline voltage 304 is positive, and wordline voltage 306 is negative. In this example, the magnitude of voltage 302 is less than the magnitude of voltage 304. Voltage 302 is used for drift cancellation, and voltage 304 is used for changing the logic state of a memory cell.

In one example, phase 1 is used for drift cancellation of first memory cells in a logic 1 state, and phase 2 is used for programming the first memory cells from the logic 1 state to a logic 0 state. Phase 2 is also used for drift cancellation of second memory cells in a logic 0 state. Phase 3 is used for programming the second memory cells from the logic 0 state to the logic 1 state.

In one example, a pulse as applied to a memory cell includes the application of a voltage across the terminals of a two-terminal memory cell. In one example, a positive voltage is applied to a first terminal connected to a bitline, and a negative voltage is applied to a second terminal connected to a wordline.

Figure 4:
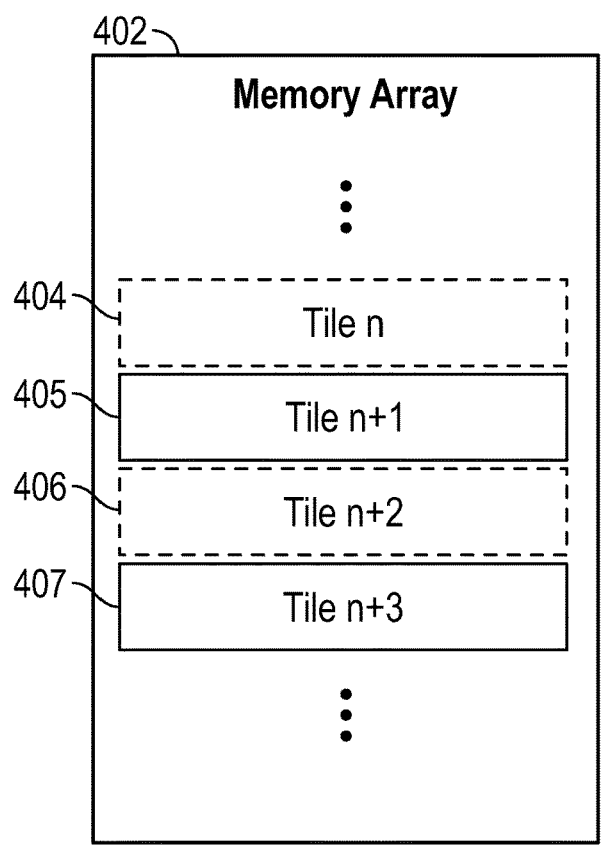
FIG. 4 shows a memory array including tiles having memory cells, in accordance with some embodiments.

FIG. 4 shows a memory array 402 including tiles having memory cells, in accordance with some embodiments. The memory cells are arranged in various tiles, which are programmed in parallel. The tiles are organized or split into two groups. One group includes tiles 404, 406, etc. (e.g., even tiles). The other group includes tiles 405, 407, etc. (e.g., odd tiles). Charge sharing is done between these two groups.

In other embodiments charge sharing can be done between more than two groups. For example, the charge sharing can be done at a time (e.g., during programming) when a wordline(s) in any group is at a first polarity, and the wordline(s) in another group are at an opposite second polarity.

In some examples, the tiles may refer to the smallest addressable portion of a memory array 402. For example, a tile may include or be associated with a 1 k×1 k or a 2 k×2 k portion of the memory array. Moreover, a memory controller may be configured to perform access operations and drift cancelation operations on one or more memory cells. Each tile may include independent access lines for the memory cells in the tile. Each tile may include independent sense amplifiers, in some cases.

In some instances, an access operation (e.g., a write operation) may be performed on a single memory cell in a tile at a time. For example, if a particular access operation is performed on sixty-four (64) memory cells, the access operation may be performed on one memory cell in each of sixty-four tiles.

Additionally or alternatively, parallel access operations may be performed on the memory array 402. For example, in a parallel access operation, more than one bit may be read from or written to within a single tile for an access operation. For example, for an access operation performed on sixty-four (64) memory cells, the access operation may be performed on eight (8) memory cells in each of eight (8) tiles.

In one example, memory array 402 is formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by another doping approach.

Figure 5:
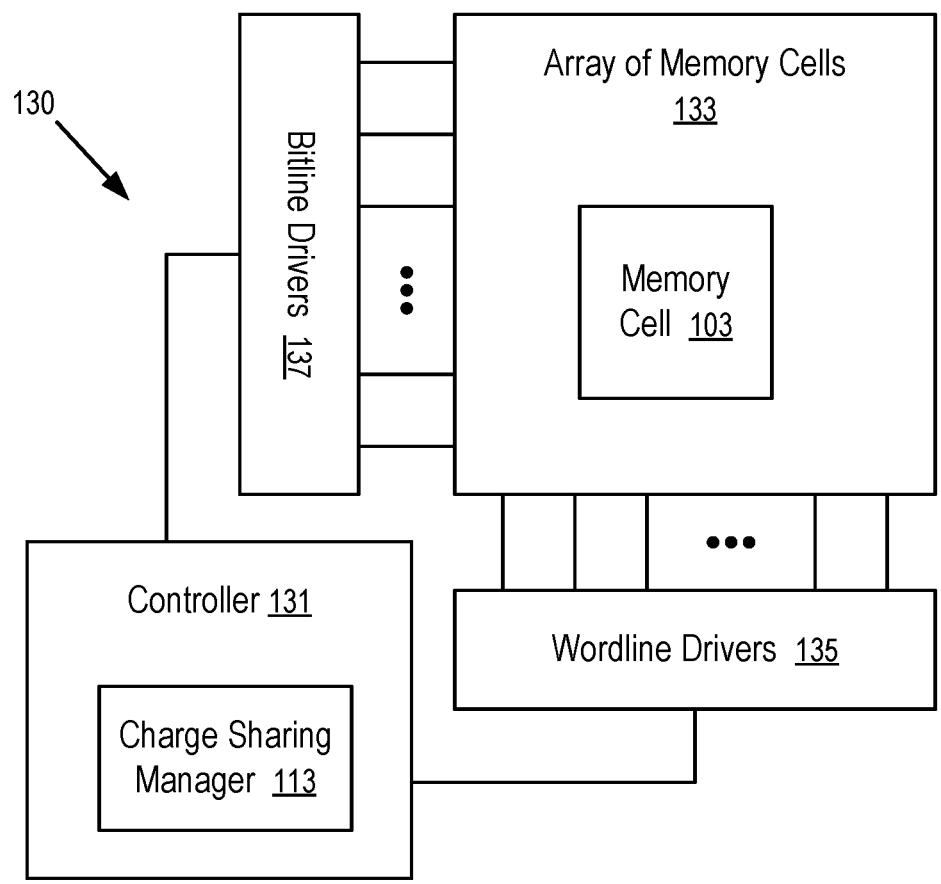
FIG. 5 shows a memory device configured with a charge sharing manager, in accordance with some embodiments.

FIG. 5 shows a memory device 130 configured with a charge sharing manager 113, in accordance with some embodiments. Charge sharing manager 113 is included in controller 131 and controls charge sharing to boost wordlines as described herein. Charge sharing manager 113 may be implemented, for example, via logic circuits and/or microcodes/instructions. In one example, the charge sharing manager 113 detects wordline voltages to determine actions to take. In one example, charge sharing manager 113 is implemented using firmware that controls charge sharing circuit 170.

Memory device 130 is an example of memory device 101. In FIG. 5, the memory device 130 includes an array 133 of memory cells, such as a memory cell 103. In one example, an array 133 can be a tile or multiple tiles; and a memory device (e.g., 130) can have one or more tiles. Different tiles can be operated in parallel in a memory device (e.g., 130).

For example, the memory device 130 illustrated in FIG. 5 can have a cross-point memory having at least the array 133 of memory cells (e.g., 103). In another example, the memory device 130 illustrated in FIG. 5 can have a 3D vertical architecture having at least the array 133 of memory cells (e.g., 103).

In some implementations, the cross point memory uses a memory cell 103 that has an element (e.g., a sole element) acting both as a selector device and a memory device. For example, the memory cell 103 can use a single piece of alloy with variable threshold capability. The read/write operations of such a memory cell 103 can be based on thresholding the memory cell 103 while inhibiting other cells in sub-threshold bias, in a way similar to the read/write operations for a memory cell having a first element acting as a selector device and a second element acting as a phase-change memory device that are stacked together as a column. A selector device usable to store information can be referred to as a selector/memory device.

Controller 131 operates bitline drivers 137 and wordline drivers 135 to access the individual memory cells (e.g., 103) in the array 133. For example, each memory cell (e.g., 103) in the array 133 can be accessed via voltages driven by a pair of a bitline driver 147 and a wordline driver 145, as illustrated in FIG. 6.

Figure 6:
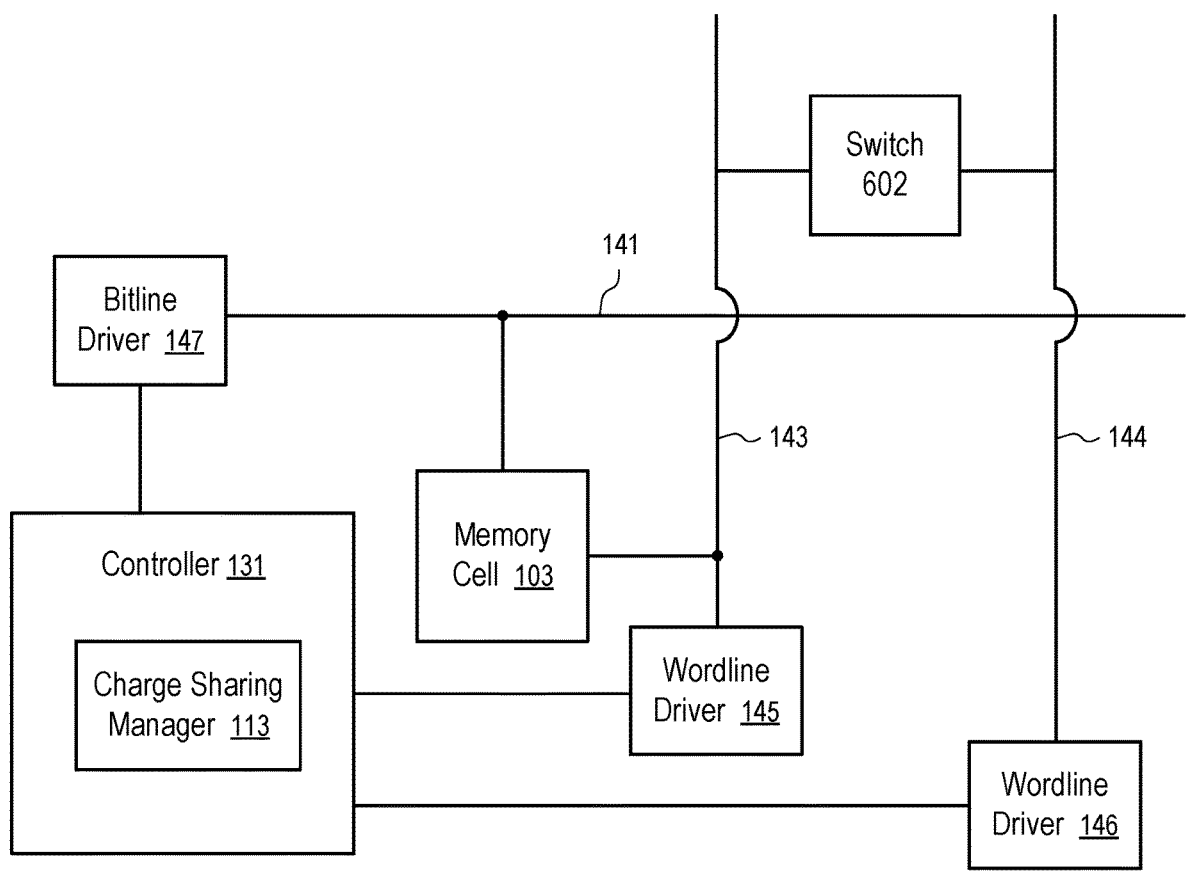
FIG. 6 shows a memory cell with a bitline driver and a wordline driver configured to apply voltages to the memory cell, and a switch to implement charge sharing between wordlines when programming the memory cell, in accordance with some embodiments.

FIG. 6 shows a memory cell 103 with a bitline driver 147 and wordline driver 145 configured to apply voltages to memory cell 103. For example, the memory cell 103 can be a typical memory cell 103 in the memory cell array 133 of FIG. 5.

Wordline driver 146 is configured to apply voltages to other memory cells (not shown) being programmed in parallel with memory cell 103. A switch 602 is configured to provide charge sharing between wordlines 143, 144 when programming the memory cell 103, in accordance with some embodiments.

The bitline driver 147 and the wordline driver 145 of FIG. 6 are controlled by controller 131 to selectively apply one or more voltage pulses to the memory cell 103 (e.g., during a write operation). The bitline driver 147 and the wordline driver 145 can apply voltages of different polarities on the memory cell 103.

For example, in applying one polarity of voltage (e.g., positive polarity), the bitline driver 147 drives a positive voltage relative to the ground on a bitline 141 connected to a row of memory cells in the array 133; and the wordline driver 145 drives a negative voltage relative to the ground on a wordline 143 connected to a column of memory cells in the array 133.

In applying the opposite polarity of voltage (e.g., negative polarity), the bitline driver 147 drives a negative voltage on the bitline 141; and the wordline driver 145 drives a positive voltage on the wordline 143.

When programming memory cell 103, charge sharing manager 113 controls (e.g., turns on) switch 602 to boost the voltage of wordline 143 by, for example, discharging wordline 144 and charging wordline 143. Wordline 144 is, for example, one of wordlines 210, 212 or 211, 213.

The memory cell 103 is in both the row connected to the bitline 141 and the column connected to the wordline 143. Thus, the memory cell 103 is subjected to the voltage difference between the voltage driven by the bitline driver 147 on the bitline 141 and the voltage driven by the wordline driver 145 on the wordline 143.

In general, when the voltage driven by the bitline driver 147 is higher than the voltage driven by the wordline driver 145, the memory cell 103 is subjected to a voltage in one polarity (e.g., positive polarity); and when the voltage driven by the bitline driver 147 is lower than the voltage driven by the wordline driver 145, the memory cell 103 is subjected to a voltage in the opposite polarity (e.g., negative polarity).

In some implementations, the memory cell 103 is a self-selecting memory cell implemented using a selector/memory device. The selector/memory device has a chalcogenide (e.g., chalcogenide material and/or chalcogenide alloy). For example, the chalcogenide material can include a chalcogenide glass such as, for example, an alloy of selenium (Se), tellurium (Te), arsenic (As), antimony (Sb), carbon (C), germanium (Ge), and silicon (Si). A chalcogenide material can primarily have selenium (Se), arsenic (As), and germanium (Ge) and be referred to as SAG-alloy. SAG-alloy can include silicon (Si) and be referred to as SiSAG-alloy. In some embodiments, the chalcogenide glass can include additional elements such as hydrogen (H), oxygen (O), nitrogen (N), chlorine (CI), or fluorine (F), each in atomic or molecular forms.

The selector/memory device has a top side and a bottom side. A top electrode is formed on the top side of the selector/memory device for connecting to bitline 141; and a bottom electrode is formed on the bottom side of the selector/memory device for connecting to a wordline 143. For example, the top and bottom electrodes can be formed of a carbon material. For example, a chalcogenide material of the memory cell 103 can take the form of a crystalline atomic configuration or an amorphous atomic configuration. The threshold voltage of the memory cell 103 can be dependent on the ratio of the material in the crystalline configuration and the material of the amorphous configuration in the memory cell 103. The ratio can change under various conditions (e.g., having currents of different magnitudes and directions going through the memory cell 103).

A self-selecting memory cell 103, having a selector/memory device, can be programmed to have a threshold voltage window. The threshold voltage window can be created by applying programming pulses with opposite polarity to the selector/memory device. For example, the memory cell 103 can be biased to have a positive voltage difference between two sides of the selector/memory device and alternatively, or to have a negative voltage difference between the same two sides of the selector/memory device. When the positive voltage difference is considered in positive polarity, the negative voltage difference is considered in negative polarity that is opposite to the positive polarity. Reading can be performed with a given/fixed polarity. When programmed, the memory cell has a low threshold (e.g., lower than the cell that has been reset, or a cell that has been programmed to have a high threshold), such that during a read operation, the read voltage can cause a programmed cell to snap and thus become conductive while a reset cell remains non-conductive.

For example, to program the voltage threshold of the memory cell 103, the bitline driver 147 and the wordline driver 145 can drive a pulse of voltage onto the memory cell 103 in one polarity (e.g., positive polarity) to snap the memory cell 103 such that the memory cell 103 is in a conductive state. While the memory cell 103 is conductive, the bitline driver 147 and the wordline driver 145 continue driving the programming pulse to change the threshold voltage of the memory cell 103 towards a voltage region that represents the data or bit value(s) to be stored in the memory cell 103.

In one example, the array of memory cells 133 can be configured in an integrated circuit having a plurality of decks of memory cells. Each deck can be sandwiched between a layer of bitlines, a layer of wordlines; and the memory cells in the deck can be arranged in an array 133. A deck can have one or more arrays or tiles. Adjacent decks of memory cells may share a layer of bitlines (e.g., 141) or a layer of wordlines (e.g., 143). Bitlines are arranged to run in parallel in their layer in one direction; and the wordlines are arranged to run in parallel in their layer in another direction orthogonal to the direction of the bitlines. Each of the bitlines is connected to a row of memory cells in the array; and each of the wordlines is connected to a column of memory cells in the array. Bitline drivers 137 are connected to bitlines in the decks; and wordline drivers 135 are connected to wordlines in the decks. Thus, a typical memory cell 103 is connected to a bitline driver 147 and a wordline driver 145.

In some embodiments, the threshold voltage of a typical memory cell 103 is configured to be sufficiently high such that when only one of its bitline driver 147 and wordline driver 145 drives a voltage in either polarity while the other voltage driver holds the respective line to the ground, the magnitude of the voltage applied across the memory cell 103 is insufficient to cause the memory cell 103 to become conductive. Thus, addressing the memory cell 103 can be performed via both of its bitline driver 147 and wordline driver 145 driving a voltage in opposite polarity relative to the ground for operating/selecting the memory cell 103. Other memory cells connected to the same wordline driver 145 can be de-selected by their respective bitline drivers holding the respective bitlines to the ground; and other memory cells connected to the same bitline driver can be de-selected by their respective wordline drives holding the respective wordlines to the ground.

A group of memory cells (e.g., 103) connected to a common wordline driver 145 can be selected for parallel operation by their respective bitline drivers (e.g., 147) driving up the magnitude of voltages in one polarity while the wordline driver 145 is also driving up the magnitude of a voltage in the opposite polarity. Similarly, a group of memory cells connected to a common bitline driver 147 can be selected for parallel operation by their respective wordline drivers (e.g., 145) driving voltages in one polarity while the bitline driver 147 is also driving a voltage in the opposite polarity.

At least some examples are disclosed herein in reference to a cross-point memory having self-selecting memory cells. Other types of memory cells and/or memory can also be used. For example, memory cells each having a selector device and a phase-change memory device can also be used in at least some embodiments. Additionally or alternatively, the memory can have a different architecture, such as a 3D vertical architecture.

Figure 7:
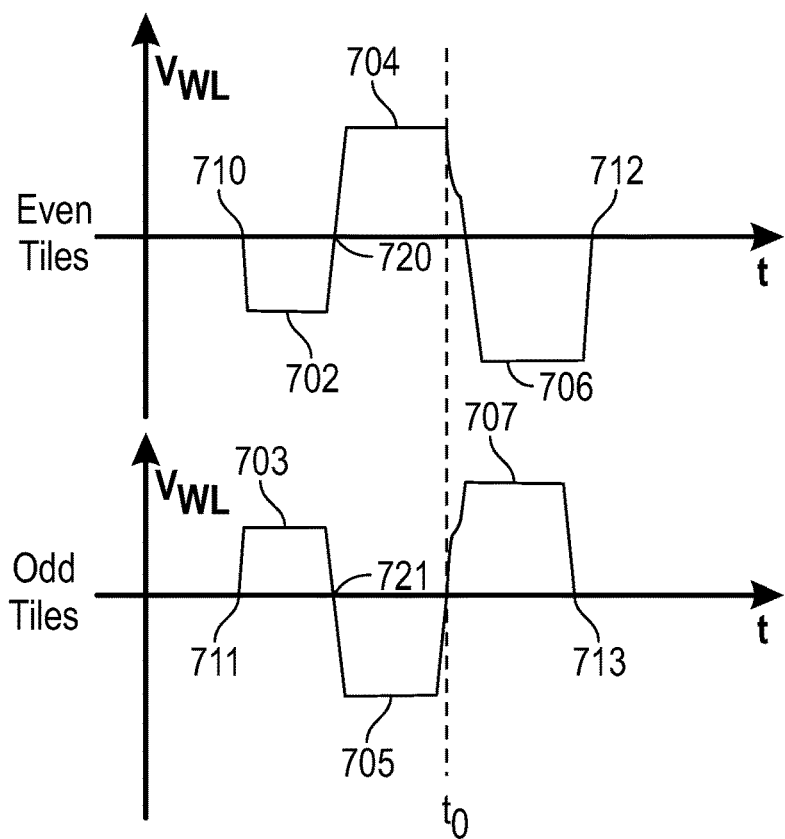
FIG. 7 shows exemplary voltage waveforms applied to wordlines in a counter-phase manner in which a polarity of phases of the waveform applied to wordlines for even tiles is opposite to a polarity of phases of the waveform applied to wordlines for odd tiles, in accordance with some embodiments.

FIG. 7 shows exemplary voltage waveforms applied to wordlines in a counter-phase manner in which a polarity of phases of the waveform applied to wordlines for even tiles is opposite to a polarity of phases of the waveform applied to wordlines for odd tiles, in accordance with some embodiments. In one example, the even tiles are tiles 204 and the odd tiles are tiles 205. In one example, the even tiles are tiles 404, 406, and the odd tiles are tiles 405, 407.

It should be noted that the notation of even and odd is used merely for purposes of illustration and does not imply any limitation on addressing and/or organization (e.g., grouping) of the tiles. The tiles may be operated in parallel and grouped in any number and manner as desired, as long as at least one tile is operating in each of the positive and negative polarities so that charge sharing can be performed.

The voltage applied to wordlines of the even tiles has three phases as illustrated. Each phase corresponds to a voltage 702, 704, 706. The waveform is initiated at time 710 and ends at time 712. Each phase corresponds to a pulse applied to selected memory cells.

Although not illustrated, a bitline voltage is also applied to the memory cells. In one embodiment, the applied bitline voltage is of a polarity that is opposite to the applied wordline voltage.

The voltage applied to wordlines of the odd tiles has three phases as illustrated. Each phase corresponds to a voltage 703, 705, 707. The waveform is initiated at time 711 and ends at time 713. In this illustrated embodiment, the latency of the even tiles and odd tiles is the same (e.g., the same within a plus or minus 5-10% margin) because each waveform is started at the same time 710, 711, and each waveform ends at the same time 712, 713. The two voltage waveforms operate in a counter-phase manner because the voltage at any given time for each waveform is of opposite polarity.

One example of charge sharing is illustrated at time to. At time to the voltage of the wordline for the odd tiles reaches 0 V. Charge sharing is initiated in which the wordline for the even tiles is connected to the wordline for the odd tiles. The even tiles wordline is discharged while the odd tiles wordline is charged. This charge sharing continues until the voltage magnitude of each of the wordlines for the even tiles and odd tiles is about one half of the starting voltage 704 magnitude of the wordline for the even tiles (e.g., the charge is roughly evenly split between the wordlines). This provides a boost in the voltage of the wordline for the odd tiles. Although not illustrated, a charge sharing boost can also additionally or alternatively be placed at the end of the first pulse at time 720, 721.

In one example, the charge sharing is initiated by controller 120, 208 and charge is transferred using switching circuit 202 or switch 602.

In one example for the odd tiles waveform, phase 1 (applied odd tiles voltage 703) is used for drift cancellation of first memory cells in a logic 0 state, and phase 2 (applied odd tiles voltage 705) is used for programming the first memory cells from the logic 0 state to a logic 1 state. Phase 2 is also used for drift cancellation of second memory cells in a logic 1 state. Phase 3 (applied odd tiles voltage 707) is used for programming the second memory cells from the logic 1 state to the logic 0 state.

The applied waveform for the even tiles provides similar, but inverse, functionality to the odd tiles example above due to its operation in a counter-phase manner (e.g., see discussion of the wordline waveform for FIG. 3 above).

Figure 8:
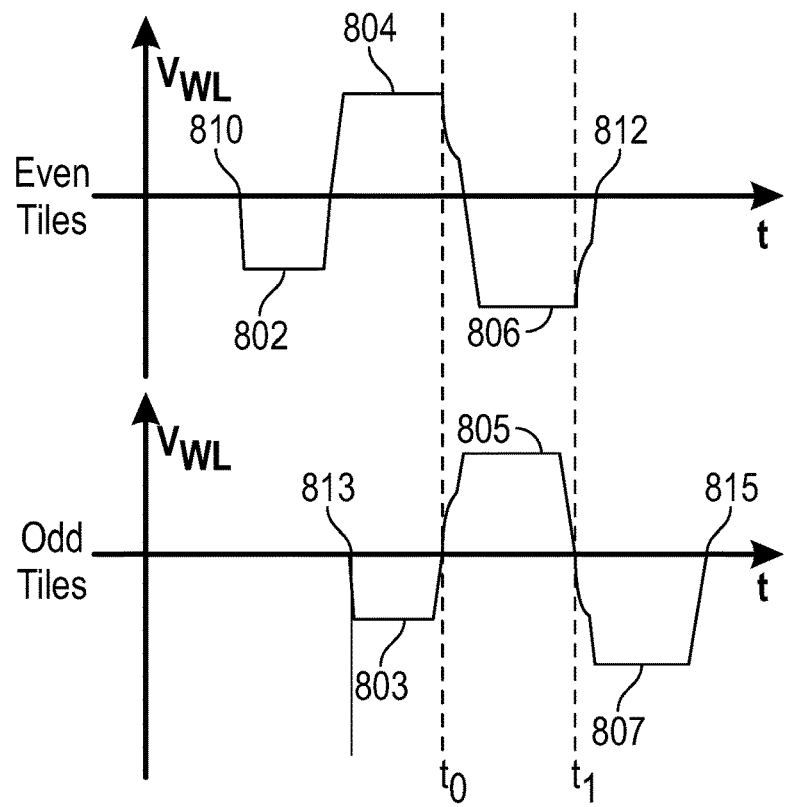
FIG. 8 shows exemplary voltage waveforms applied to wordlines in a counter-phase manner in which the waveform applied to wordlines for even tiles is of a same shape as the waveform applied to wordlines for the odd tiles, but the start of the waveform for the odd tiles is delayed relative to the start of the waveform for the even tiles, in accordance with some embodiments.

FIG. 8 shows exemplary voltage waveforms applied to wordlines in a counter-phase manner in which the waveform applied to wordlines for even tiles is of a same shape as the waveform applied to wordlines for the odd tiles, but the start of the waveform for the odd tiles is delayed relative to the start of the waveform for the even tiles, in accordance with some embodiments.

The voltage waveform applied to the even tiles is applied in three phases corresponding to voltages 802, 804, 806. The voltage waveform is initiated or started at time 810 and ends at time 812.

The voltage waveform is applied to the odd tiles is applied in three phases corresponding to voltages 803, 805, 807. The voltage waveform is initiated or started at time 813 and ends at time 815.

The overall latency for programming of the even and odd tiles is increased relative to the latency of FIG. 7 above. Specifically, end time 815 is later than end time 812 (and end times 712, 713). As illustrated, the voltage waveforms are of the same shape, but the waveform for the odd tiles is started at a later time 813 as compared to the start time 810 for the waveform for the even tiles. In one example, time 813 is 20-40 nanoseconds later than time 810.

In FIG. 8 a charge sharing boost is illustrated for each of times to and ti. At time to, when the wordline of the odd tiles is 0 V, the wordline of the even tiles is used to boost the pull-up of the wordline of the odd tiles. In one example, the wordline of the odd tiles is boosted until each wordline is at about one half of the initial magnitude of voltage 804.

At time ti, when the wordline of the odd tiles is 0 V, the wordline of the even tiles will boost the pull-down of the wordline of the odd tiles. In one example, the wordline of the tiles is boosted until each wordline is about one half of the initial magnitude of the voltage 806.

The staggering of the waveforms in FIG. 8 results in longer latency. However, using the same shape for the voltage waveforms in some cases may permit better control of the programming performance for the memory cells (e.g., across various regions of a memory array). Also, more energy is recovered by using the two boosts of FIG. 8 as compared to using one boost in FIG. 7.

Although illustrated with respect to programming of memory cells, the charge sharing boost approach as described herein can also be applied to other operations of a memory device. For example, the charge sharing boost can be applied to a read, refresh, and/or precharge operation. For such other operations, memory cells are split into two groups and operated in a counter-phase manner.

In one example, a charge sharing boost is used for reading memory cells having two or more levels. The read operation requires at least one flip in the polarity of the wordlines.

In one example, a self-selecting memory cell is used and has a threshold voltage in negative polarity and a threshold voltage in positive polarity. When a voltage applied on the memory cell in either polarity is increased in magnitude up to its threshold voltage in the corresponding polarity, the memory cell snaps from a non-conductive state to a conductive state.

The threshold voltage of a memory cell (e.g., 103) in negative polarity and the threshold voltage of the memory cell (e.g., 103) in positive polarity can have different magnitudes. Memory cells programmed to have large magnitudes in threshold voltages in positive polarity can have small magnitudes in threshold voltages in negative polarity; and memory cells programmed to have small magnitudes in threshold voltages in positive polarity can have large magnitudes in threshold voltages in negative polarity.

For example, a memory cell can be programmed to have a small magnitude in threshold voltage in the positive polarity to represent a value (e.g., one); and as a result, its threshold voltage has a large magnitude in the negative polarity to represent the same value (e.g., one). Alternatively, the memory cell can be programmed to have a large magnitude in threshold voltage the positive polarity to represent another value (e.g., zero); and as a result, its threshold voltage has a smaller magnitude in the negative polarity to represent the same value (e.g., zero).

Thus, to determine whether a memory cell 103 is storing the one value (e.g., one) or the other value (e.g., zero), a controller can read the memory cell 103 in either the positive polarity or the negative polarity. If the threshold voltage of the memory cell 103 has a large magnitude in the positive polarity, it stores the other value (e.g., zero); otherwise, it stores the one value (e.g., one). Similarly, if the threshold voltage of the memory cell 103 has a large magnitude in the negative polarity, it stores the one value (e.g., one); otherwise, it stores the other value (e.g., zero).

Figure 9:
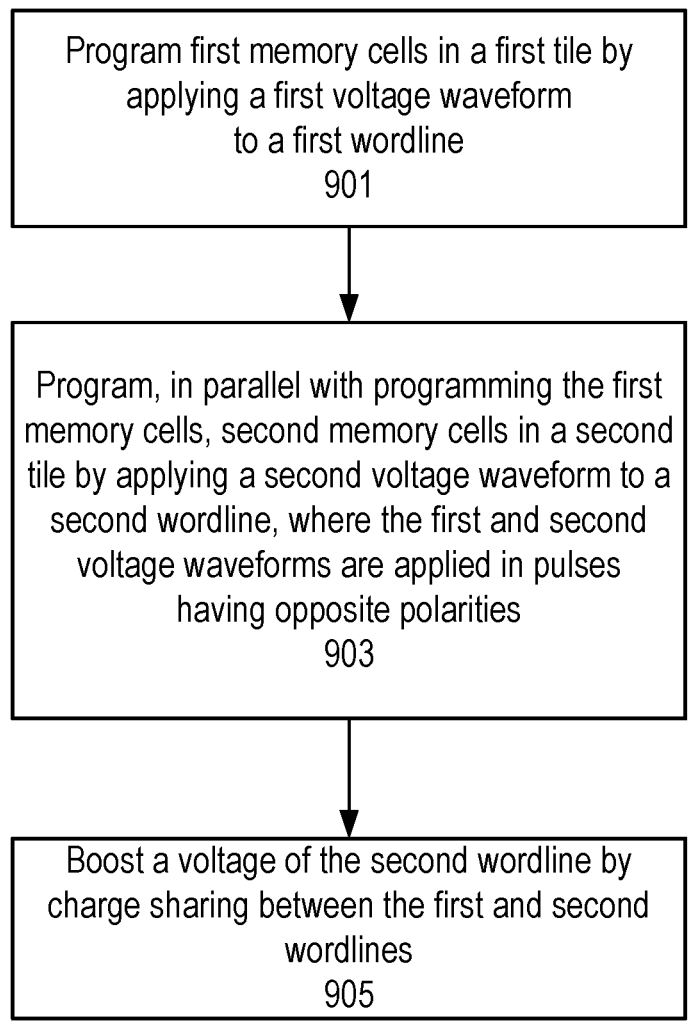
FIG. 9 shows a method for charge sharing between wordlines to boost the voltage of one wordline by discharging another wordline, in accordance with some embodiments.

FIG. 9 shows a method for charge sharing between wordlines to boost the voltage of one wordline by discharging another wordline, in accordance with some embodiments. For example, the method of FIG. 9 can be implemented in the system of FIG. 1, 2, 5, or 6.

The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 9 is performed at least in part by one or more processing devices (e.g., controller 120 of FIG. 1, controller 208 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 901, first memory cells in a first tile are programmed by applying a first voltage waveform to a first wordline. In one example, the first tile is tile 204. In one example, the first voltage waveform is the waveform applied to the wordline of the even tiles of FIG. 7 or 8.

At block 903, in parallel with programming the first memory cells, second memory cells in a second tile are programmed by applying a second voltage waveform to a second wordline. The first and second voltage waveforms are applied in pulses having opposite polarities. In one example, the second tile is tile 205. In one example, the second voltage waveform is the waveform applied to the wordline of the odd tiles of FIG. 7 or 8.

At block 905, a voltage of the second wordline is boosted by charge sharing between the first and second wordlines. In one example, the charge sharing occurs at time to in FIG. 7, or to, ti in FIG. 8.

In one embodiment, an apparatus comprises: at least one memory array (e.g., 102, 402) having at least one first tile and at least one second tile, each of the first and second tiles including memory cells; access lines (e.g., 160, 161) configured to select at least a portion of the memory cells in the first and second tiles; and at least one controller (e.g., 120, 208) configured to program the selected memory cells. Memory cells in the first tile are programmed by applying a first voltage (e.g., wordline voltage waveform applied to even tiles of FIG. 7) to a first access line; memory cells in the second tile are programmed by applying a second voltage (e.g., wordline voltage waveform applied to odd tiles of FIG. 7) to a second access line; the first and second voltages are applied in a counter-phase manner; and the second voltage is boosted by charge sharing between the first and second access lines.

In one embodiment, applying the first and second voltages in a counter-phase manner comprises applying the first and second voltages in parallel using opposite polarities (e.g., FIG. 7).

In one embodiment, applying the first and second voltages in a counter-phase manner comprises applying the first and second voltages using waveforms of the same shape, and delaying a start of applying the second voltage relative to a start of applying the first voltage (e.g., FIG. 8).

In one embodiment, the first and second access lines are wordlines (e.g., 210, 212, 211, 213); and the start of applying the second voltage is delayed so that while programming memory cells in the first and second tiles in parallel, the first voltage applied to the first wordline is of an opposite polarity to the second voltage applied to the second wordline.

In one embodiment, the first voltage is a first voltage waveform, the second voltage is a second voltage waveform, and the first and second voltage waveforms are identical.

In one embodiment, boosting by charge sharing comprises discharging the first access line and charging the second access line.

In one embodiment, the apparatus further comprises a switch (e.g., switching circuit 202, switch 602) coupling the first and second access lines, wherein the charge sharing is controlled by the switch.

In one embodiment, the switch comprises one or more transistors controlled by the controller.

In one embodiment, applying the first voltage comprises applying a first pulse (e.g., phase 1 of FIG. 3) for drift cancellation for memory cells in a first logic state (e.g., 1), and applying a second pulse (e.g., phase 2 of FIG. 3) for programming memory cells from the first logic state (e.g., 1) to a second logic state (e.g., 0).

In one embodiment, the second pulse is further for drift cancellation for memory cells in the second logic state (e.g., 0); and applying the first voltage further comprises applying a third pulse for programming memory cells from the second logic state (e.g., 0) to the first logic state (e.g., 1).

In one embodiment, the controller initiates the charge sharing in response to detecting a change in polarity of the second voltage.

In one embodiment, detecting the change in polarity of the second voltage comprises determining that the second voltage is changing from negative to positive, or from positive to negative.

In one embodiment, the apparatus further comprises a switch, wherein: the first and second access lines are wordlines; and the first and second wordlines are coupled by the switch for charge sharing.

In one embodiment, the controller is further configured to end the charge sharing after 45 to 55 percent of charge on the first access line is transferred to the second access line.

In one embodiment, boosting the second voltage comprises: pulling up the second voltage by discharging the first access line and charging the second access line; or pulling down the second voltage by charging the first access line and discharging the second access line.

In one embodiment, an apparatus comprises: at least one memory array having first memory cells and second memory cells; a first wordline configured to select the first memory cells; a second wordline configured to select the second memory cells; and at least one controller configured to program the first and second memory cells in parallel by: applying a first voltage to the first wordline to program the first memory cells; applying a second voltage to the second wordline to program the second memory cells; and boosting the second voltage using charge sharing between the first and second wordlines.

In one embodiment, the first and second voltages are applied with an opposite polarity while programming the first and second memory cells.

In one embodiment, the boosting of the second voltage is a first boost, and the controller is further configured to, during a write operation to program the first and second memory cells, provide a second boost of the second voltage using charge sharing between the first and second wordlines.

In one embodiment, applying the first voltage to the first wordline comprises applying a first pulse to program a first set of the first memory cells to a first logic state, and applying a second pulse to program a second set of the first memory cells to a second logic state.

In one embodiment, the apparatus further comprises a switch electrically coupling the first and second wordlines, wherein: the first memory cells are located in one or more first tiles; the second memory cells are located in one or more second tiles; and the charge sharing is controlled using the switch.

In one embodiment, the first and second wordlines are configured in different vertical wordline decks of a memory device. In one embodiment, the first and second wordlines are configured in the same deck of a memory device.

In one embodiment, the apparatus further comprises first pillars and second pillars, wherein: the memory array has a three-dimensional cross-point architecture; the first memory cells are selected for programming using the first wordline and the first pillars; and the second memory cells are selected for programming using the second wordline and the second pillars.

In one embodiment, the first pillars are used as bitlines in the memory array; the first wordline is a first conductive layer; the first conductive layer is one of a plurality of vertically-stacked conductive layers, each conductive layer is separated from another conductive layer by an insulating layer, and each conductive layer is used as a wordline in the memory array; and the first pillar extends vertically through the conductive layers.

The memory array and memory cells described herein are not limited to use in a planar architecture (e.g., with cells at crossing of wordlines (WLs) and bitlines (BLs) on different levels). Instead, the approach also can be used for vertical architectures (e.g., vertical BL pillars crossing horizontal WL planes).

In one embodiment, a vertical architecture is used for a memory device. A memory array of the memory device includes memory cells. Each memory cell can be selected using a wordline and a digit line.

Each wordline extends in one of a plurality of horizontal planes of wordlines stacked vertically above a semiconductor substrate. Each digit line or bitline includes a pillar. Each pillar extends vertically away from the semiconductor substrate. Each memory cell is located on sides of one of pillars.

In one embodiment, the memory array has a vertical array architecture comprising vertical bitlines (e.g., vertical pillars) or digit lines intersecting a plurality of horizontal decks of wordlines (e.g., even wordlines and odd wordlines). Each deck is configured as two interdigitated wordline combs so that each bitline or digit line forms two cells at each of the decks. In one example, even wordlines are interdigitated with odd wordlines in a comb structure.

In one embodiment, wordline plates are organized in interdigited combs (with bitline pillars in between fingers of different combs) at each of various levels (e.g., decks), so that two memory cells are formed at each level (e.g., deck) at the crossing of a pillar and the pair of (electrically independent) wordline fingers at the crossing.

In one embodiment, a method comprises: programming first memory cells in at least one first tile by applying a first voltage waveform to at least one first wordline; programming, in parallel with programming the first memory cells, second memory cells in at least one second tile by applying a second voltage waveform to at least one second wordline, wherein the first and second voltage waveforms are applied in pulses having opposite polarities; and boosting a voltage of the second wordline by charge sharing between the first and second wordlines.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:
    at least one memory array having at least one first tile and at least one second tile, each of the first and second tiles including memory cells;
    access lines configured to select at least a portion of the memory cells in the first and second tiles; and
    at least one controller configured to program the selected memory cells, wherein:
        the selected portion of the memory cells in the first tile are programmed by applying a first voltage to a first access line of the access lines;
        the selected portion of the memory cells in the second tile are programmed by applying a second voltage to a second access line of the access lines;
        the first and second voltages are applied in a counter-phase manner; and
        the second voltage is boosted by charge sharing between the first and second access lines;
        wherein applying the first and second voltages in a counter-phase manner comprises applying the first and second voltages in parallel using opposite polarities.

2. The apparatus of claim 1, wherein applying the first and second voltages in a counter-phase manner comprises applying the first and second voltages using waveforms of the same shape, and delaying a start of applying the second voltage relative to a start of applying the first voltage.

3. The apparatus of claim 2, wherein:
    the first and second access lines are wordlines; and
    the start of applying the second voltage is delayed so that while programming memory cells in the first and second tiles in parallel, the first voltage applied to the first wordline is of an opposite polarity to the second voltage applied to the second wordline.

4. The apparatus of claim 1, wherein the first voltage is a first voltage waveform, the second voltage is a second voltage waveform, and the first and second voltage waveforms are identical.

5. The apparatus of claim 1, wherein boosting by charge sharing comprises discharging the first access line and charging the second access line.

6. The apparatus of claim 1, further comprising a switch coupling the first and second access lines, wherein the charge sharing is controlled by the switch.

7. The apparatus of claim 6, wherein the switch comprises one or more transistors controlled by the controller.

8. The apparatus of claim 1, wherein applying the first voltage comprises applying a first pulse for drift cancellation for the selected portion of the memory cells in the first tile in a first logic state, and applying a second pulse for programming the selected portion of the memory cells in the first tile from the first logic state to a second logic state.

9. The apparatus of claim 8, wherein:
    the second pulse is further for drift cancellation for the selected portion of the memory cells in the first tile in the second logic state; and
    applying the first voltage further comprises applying a third pulse for programming the selected portion of the memory cells in the first tile from the second logic state to the first logic state.

10. The apparatus of claim 1, wherein the controller initiates the charge sharing in response to detecting a change in polarity of the second voltage.

11. The apparatus of claim 10, wherein detecting the change in polarity of the second voltage comprises determining that the second voltage is changing from negative to positive, or from positive to negative.

12. The apparatus of claim 10, further comprising a switch, wherein:
    the first and second access lines are wordlines; and
    the first and second wordlines are coupled by the switch for charge sharing.

13. The apparatus of claim 12, wherein the controller is further configured to end the charge sharing after 45 to 55 percent of charge on the first access line is transferred to the second access line.

14. The apparatus of claim 1, wherein boosting the second voltage comprises:
    pulling up the second voltage by discharging the first access line and charging the second access line; or
    pulling down the second voltage by charging the first access line and discharging the second access line.

15. An apparatus comprising:
    at least one memory array having first memory cells and second memory cells;
    a first wordline configured to select the first memory cells;
    a second wordline configured to select the second memory cells; and
    at least one controller configured to program the first and second memory cells in parallel by:
        applying a first voltage to the first wordline to program the first memory cells;
        applying a second voltage to the second wordline to program the second memory cells; and
        boosting the second voltage using charge sharing between the first and second wordlines;
        wherein the first and second voltages are applied with an opposite polarity while programming the first and second memory cells.

16. The apparatus of claim 15, wherein the boosting of the second voltage is a first boost, and the controller is further configured to, during a write operation to program the first and second memory cells, provide a second boost of the second voltage using charge sharing between the first and second wordlines.

17. The apparatus of claim 15, wherein applying the first voltage to the first wordline comprises applying a first pulse to program a first set of the first memory cells to a first logic state, and applying a second pulse to program a second set of the first memory cells to a second logic state.

18. The apparatus of claim 15, further comprising a switch electrically coupling the first and second wordlines, wherein:
    the first memory cells are located in one or more first tiles;
    the second memory cells are located in one or more second tiles; and
    the charge sharing is controlled using the switch.

19. The apparatus of claim 18, wherein the first and second wordlines are configured in:
different vertical wordline decks of a memory device; or
a same deck of the memory device.

20. The apparatus of claim 15, further comprising first pillars and second pillars, wherein:
the memory array has a three-dimensional cross-point architecture;
the first memory cells are selected for programming using the first wordline and the first pillars; and
the second memory cells are selected for programming using the second wordline and the second pillars.

21. The apparatus of claim 20, wherein:
the first pillars are used as bitlines in the memory array;
the first wordline is a first conductive layer;
the first conductive layer is one of a plurality of vertically-stacked conductive layers, each conductive layer is separated from another conductive layer by an insulating layer, and each conductive layer is used as a wordline in the memory array; and
the first pillar extends vertically through the conductive layers.

22. The apparatus of claim 15, wherein:
the memory array comprises wordline plates organized in interdigitated combs;
bitline pillars are located between electrically independent wordline fingers of different ones of the combs at each of various levels of the memory array; and
two memory cells are formed at each level at the crossing of a pillar and a pair of the wordline fingers.

23. A method comprising:
programming first memory cells in at least one first tile by applying a first voltage waveform to at least one first wordline;
programming, in parallel with programming the first memory cells, second memory cells in at least one second tile by applying a second voltage waveform to at least one second wordline, wherein the first and second voltage waveforms are applied in pulses having opposite polarities; and
boosting a voltage of the second wordline by charge sharing between the first and second wordlines.

* * * * *